(12) United States Patent
Todeschini

(10) Patent No.: US 9,250,712 B1
(45) Date of Patent: Feb. 2, 2016

(54) METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY

(71) Applicant: Hand Held Products, Inc., Fort Mill, SC (US)

(72) Inventor: Erik Todeschini, Camillus, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/664,063

(22) Filed: Mar. 20, 2015

(51) Int. Cl.
*G06K 7/10* (2006.01)
*G06F 3/023* (2006.01)

(52) U.S. Cl.
CPC ................... *G06F 3/0238* (2013.01)

(58) Field of Classification Search
CPC .............................. G06F 3/0238; G06F 3/0482
USPC ........................ 235/472.01–472.03
See application file for complete search history.

(56) References Cited

U.S. PATENT DOCUMENTS

| 7,669,770 | B2 * | 3/2010 | Wheeler | G06F 3/0238 235/472.01 |
|---|---|---|---|---|
| 2014/0026101 | A1 * | 1/2014 | Pallakoff | G06F 3/0482 715/841 |
| 2014/0283118 | A1 * | 9/2014 | Anderson | G06F 21/51 726/27 |

* cited by examiner

*Primary Examiner* — Seung Lee
(74) *Attorney, Agent, or Firm* — Additon, Higgins & Pendleton, P.A.

(57) ABSTRACT

A barcode scanning application is provided for a smartphone. The barcode scanning application includes a custom software input panel, which includes a barcode scanning key and a keyboard wedge capable of translating barcode data into keyboard strokes. The barcode scanning application, once initialized, is configured to cause the custom software input panel to be removed from the first portion of the visual display and to open a barcode viewfinder on the portion of the visual display previously occupied by the custom software input panel. The barcode scanning application is configured to scan a barcode in the viewfinder, close the viewfinder, decode the scanned barcode, and send the barcode information to the keyboard wedge. The keyboard wedge is configured to translate the decoded barcode information into keyboard strokes and send the keyboard strokes for displayed within a different application running and displayed continuously on the second portion of the visual display.

17 Claims, 6 Drawing Sheets

METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY

FIELD OF THE INVENTION

The present invention relates to barcode scanning and smart devices and in particular, to the ability to scan barcodes while running other application on a smart device.

BACKGROUND

Generally speaking, there are many smartphone applications that require the ability to scan a barcode. In order to add this functionality to their application (app), developers quite frequently rely on a 3rd party software development kits to add this functionality directly within their application. The functionality gives the smartphone user access to barcode scanning only from within that particular application. If a user wants a universal method of scanning barcodes across all their applications, usually, this is not available.

Sometimes a keyboard wedge style application is used to facilitate universal scanning in any application. A keyboard wedge can be either a software program or an inserted hardware device that translates digital signals from a barcode reader or a magnetic strip reader into keyboard strokes for a smart device or a computer. The software form of a keyboard wedge intercepts the digital signals from the reader when they arrive at the computer and instantly translates them into keyboard strokes. The hardware form of a keyboard wedge inserts the translation device between the reader and the keyboard. Data sent through a wedge appears as if it was typed into the computer, while the keyboard itself remains fully functional. Because a computer or smartphone using a keyboard wedge can't tell the difference between data that is entered by a scanning device or data that is entered by keyboard typing, a wedge can be used to easily add barcode reading capability to an existing device without modifying software applications.

A keyboard wedge-style application can be used to facilitate universal scanning in any application by keeping a background service running that responds to a particular key press. When the service detects this key press, it brings up the barcode scanner and inserts the resultant scan data into the keyboard buffer so that is it inserted at the cursor as text in whichever application has focus at the moment. This is usually a somewhat clumsy operation, as it requires a scan wedge application to first be started and running in the background. The user also needs to be aware of the hardware button that will trigger a scan event.

Today, many smartphone operating systems allow you to create custom software keyboards (soft input panels) which are sometimes used to add a barcode scanning button and scan wedge functionality. When the custom keyboard is loaded, if the user wants to enter barcode data into a text field, the user simply opens the software keyboard, hits the scanner button, scans the barcode, and the result is placed in the text field. However, when the scanning trigger occurs, the application loses context, that is the running application is no longer displayed, while the barcode scanner preview screen is displayed. This might worry some users that the application they were just in was closed and that they possibly lost their data.

Therefore, a need exists for a method and an application to scan and decode a barcode on a smartphone without losing context of a running application.

SUMMARY

Accordingly, in one aspect, the present invention embraces a barcode scanning application for a smartphone. In general, the smartphone has an embedded camera, a visual display, and an operating system. The operating system communicatively couples the embedded camera and the visual display.

In an exemplary embodiment, the barcode scanning application comprises a custom software input panel. The custom software input panel is provided with a barcode scanning key. The custom software input panel occupies a first portion of the visual display of the smartphone. The barcode scanning application further is provided with a keyboard wedge capable of translating barcode data into keyboard strokes. The barcode scanning application is communicatively coupled through the operating system to the embedded camera, the keyboard wedge and the custom software input panel. The barcode scanning application is configured to operate while a different application is running and being displayed continuously on a second portion of the visual display. The custom software input panel is configured to initiate the barcode scanning application when the barcode scanning key is touched. The barcode scanning application, once initialized, is configured to cause the custom software input panel to be removed from the first portion of the visual display and to open the barcode viewfinder on the portion of the visual display previously occupied by the custom software input panel. The barcode scanning application is further configured to scan a barcode in the viewfinder, then close the viewfinder, decode the scanned barcode, and send the barcode information to the keyboard wedge. The keyboard wedge is configured to translate the decoded barcode information into keyboard strokes and to send the keyboard strokes to be displayed within the different application running and displayed continuously on the second portion of the visual display.

In another exemplary embodiment of the invention, the keyboard wedge is a software program, and is an integral part of the custom software input panel.

In another exemplary embodiment of the invention, the keyboard wedge is a hardware device incorporated into the smartphone.

In yet another exemplary embodiment of the invention, the barcode scanning application is further configured to re-display the custom software input panel after closing the viewfinder.

In still another exemplary embodiment of the invention, the first portion of the visual display occupies less than 50% of the visual display.

In yet a further exemplary embodiment of the invention, causing the custom software input panel to be removed from the first portion of the visual display is accomplished by minimizing the custom software input panel.

In another embodiment of the invention, causing the custom software input panel to be removed from the first portion of the visual display is accomplished by closing the custom software input panel.

In another exemplary embodiment of the barcode scanning application, a smart phone is provided having an embedded camera, a visual display, and an operating system, the operating system communicatively coupling the embedded camera and the visual display. The barcode scanning application includes a custom software input panel. The custom software input panel is provided with a barcode scanning key. The custom software input panel occupies a first portion of the visual display. The custom input panel is communicatively coupled through the operating system to the embedded camera. The barcode scanning application also includes a keyboard wedge capable of translating barcode data into keyboard strokes. The keyboard wedge is an integral part of the custom software input panel. The keyboard wedge is configured to control a barcode scanning operation. The custom software input panel is configured to initiate the barcode scanning operation when the barcode scanning key is touched. The keyboard wedge is configured to operate the barcode scanning operation while a different application is running and being displayed continuously on a second portion of the visual display. The custom software input panel, upon initiating barcode scanning, is configured to minimize and to open a barcode viewfinder on the first portion of the visual display previously occupied by the custom software input panel. The keyboard wedge is configured to scan a barcode in the barcode viewfinder, close the viewfinder, decode the scanned barcode, translate the decoded barcode information into keyboard strokes, and to send the keyboard strokes to be displayed within the different application running and displayed continuously on the second portion of the visual display.

The barcode scanning application of claim 16, wherein the keyboard wedge is further configured to re-display the custom software input panel after closing the viewfinder.

In another aspect, the invention embraces a method of scanning a barcode with a smartphone while continuously running and displaying an application on a first portion of a smartphone visual display. The smartphone is provided with a user interface panel occupying a second portion of the smartphone visual display. The smartphone is further provided with barcode scanning software, a viewfinder, and an embedded camera. The barcode scanning software, the viewfinder, the embedded camera, the user interface panel, and the visual display are communicatively coupled. The method of the present invention is comprised of the following steps: i. initiating barcode scanning via the user interface panel while an application is running and being displayed on the first portion of the smartphone visual display, ii. removing the user interface panel from the second portion of the smartphone visual display, iii. opening a barcode scanning viewfinder on the second portion of the smartphone visual display previously occupied by the user interface panel, iv. routing the embedded camera video feed to the barcode scanning viewfinder, v. locating a barcode in the barcode scanning viewfinder, vi. scanning the barcode, vii. decoding the barcode, viii. closing the viewfinder, ix. translating the decoded barcode data into keyboard strokes, and x. displaying decoded barcode information on the first portion of the smartphone visual display within the running application.

In another exemplary embodiment of the method of the invention, the user interface panel is a custom software input panel. The custom software input panel is provided with a barcode scanning key. The initiating step is accomplished by touching the barcode scanning key.

In another exemplary embodiment of the method of the invention, the user interface panel is provided with voice command capability, and the initiating step is accomplished by a voice command.

In yet another exemplary embodiment of the invention, the method further comprises the step of re-displaying the custom software input panel to occupy the second portion of the smartphone visual display after the closing the viewfinder step.

In another exemplary embodiment of the invention, the decoding step is accomplished at a remote location. The remote location is wirelessly enabled and in communication with the smartphone. The method further comprises the steps of transmitting the scanned barcode image to a remote location before the decoding step, and transmitting decoded barcode information back to the smartphone after the decoding step.

In still a further exemplary embodiment of the invention, the smartphone is provided with a keyboard wedge. The keyboard wedge is communicatively coupled to the barcode scanning software. The translating step is accomplished by the keyboard wedge.

In another exemplary embodiment, the removing step is accomplished by closing the user interface.

In yet a further exemplary embodiment of the invention, the removing step is accomplished by minimizing the user interface.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a barcode scanning application for a smartphone.

Figure 1:
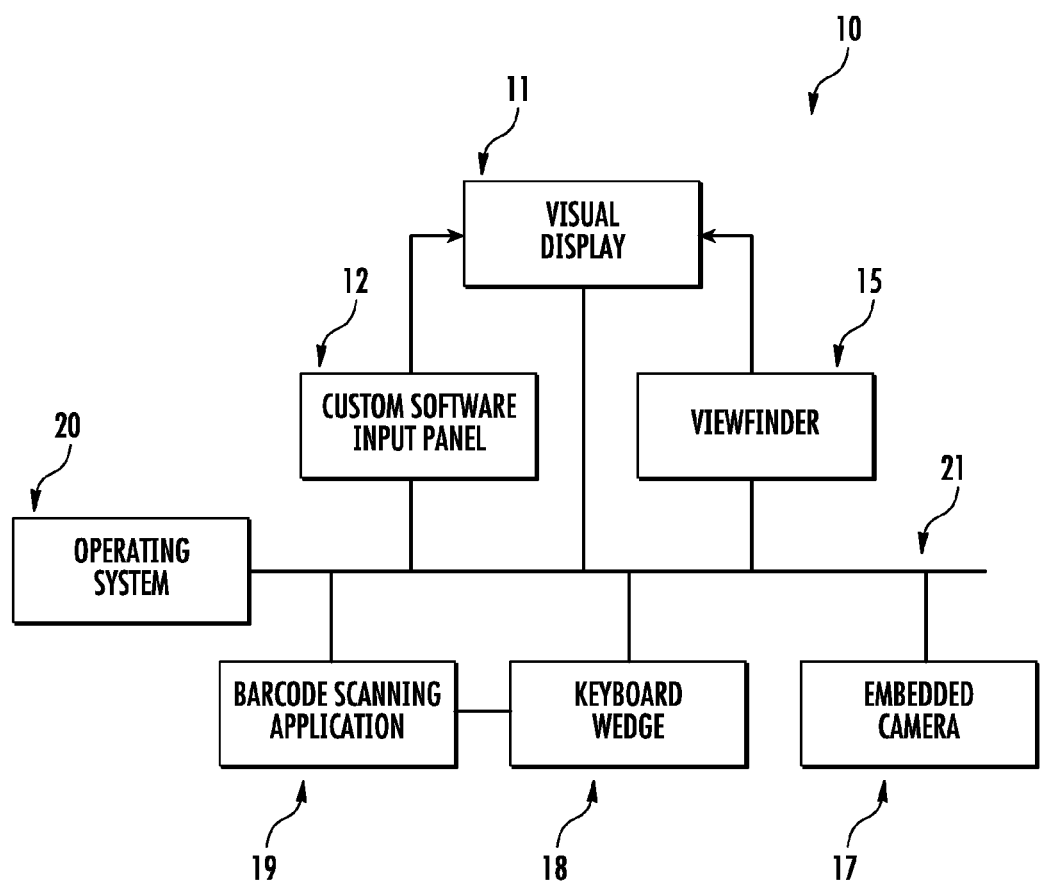
FIG. 1 schematically depicts a smartphone with components, which allow the application of the invention to operate.

In an exemplary embodiment, referring to FIG. 1, a smartphone (10) is provided with a visual display (11), an operating system (20), and an embedded camera (17). A system bus (21), in cooperation with the operating system (20) communicatively couples the embedded camera (17) and the visual display (11). The smartphone (10), in connection with the barcode scanning application (19), is provided with a custom software input panel (12) which can be displayed on the visual display (11). A keyboard wedge (18) is provided with the barcode scanning application (19) to translate barcode data into keystrokes which appear on the visual display (11) in a running application. The keyboard wedge (18), barcode scanning application (19), and the custom software input panel (12) are communicatively linked to each other and to other smartphone (10) components via the system bus (21) and the operating system (20). The smartphone (10) is also provided with a viewfinder (15) which can be displayed on the visual display (11).

The keyboard wedge (18) can translate decoded barcode information into keystrokes, which are then displayed in an application running on the visual display (11). Keyboard wedges can be software programs or can be hardware installed on the smartphone (10). Preferably, the keyboard wedge (18) is software and is an integral part of the custom software input (12) panel. Most preferably, the keyboard wedge (18) controls the barcode scanning operation.

The custom software input panel (12) is preferably designed to take up less than 50% of the visual display (11) when the custom software input panel is open, although a greater portion is possible. The custom software input panel (12) is provided with a barcode scanning key, not shown in FIG. 1.

Figure 2A:
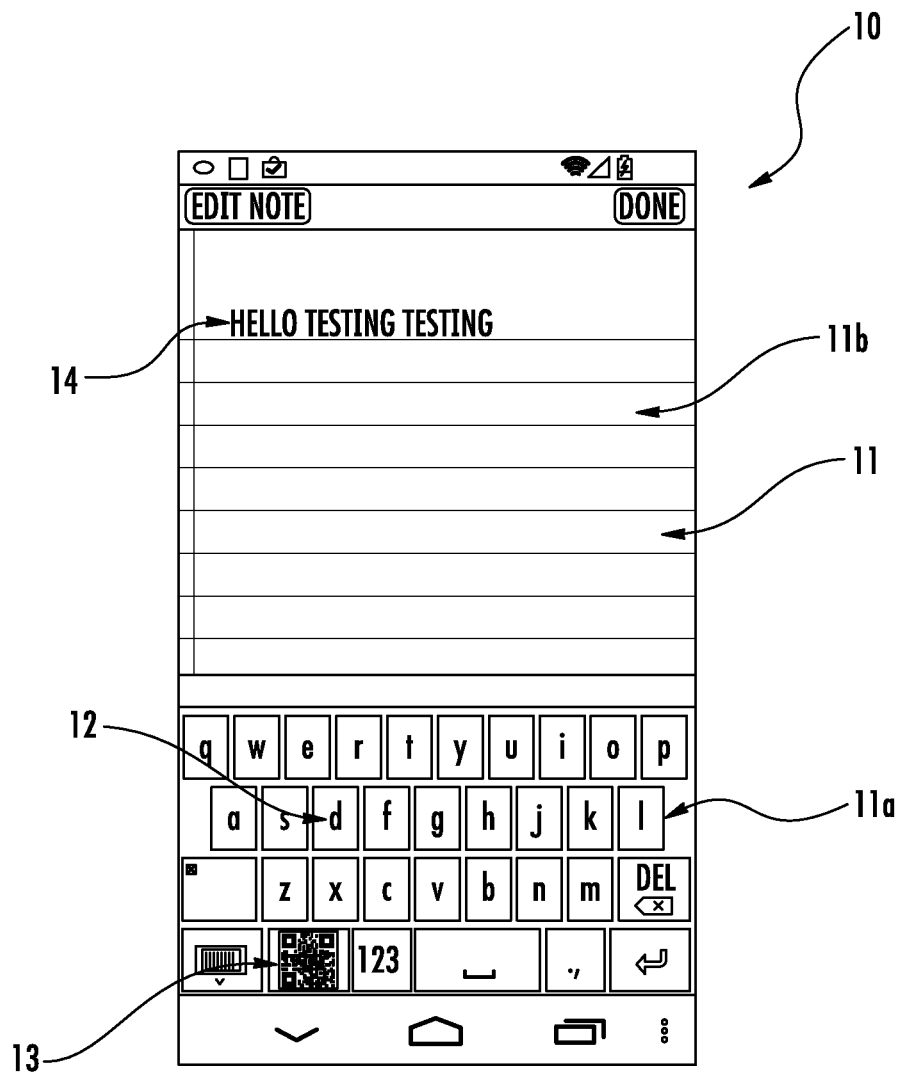
FIG. 2a-2c schematically depict the smartphone with the barcode scanning application in operation.
Figure 2B:
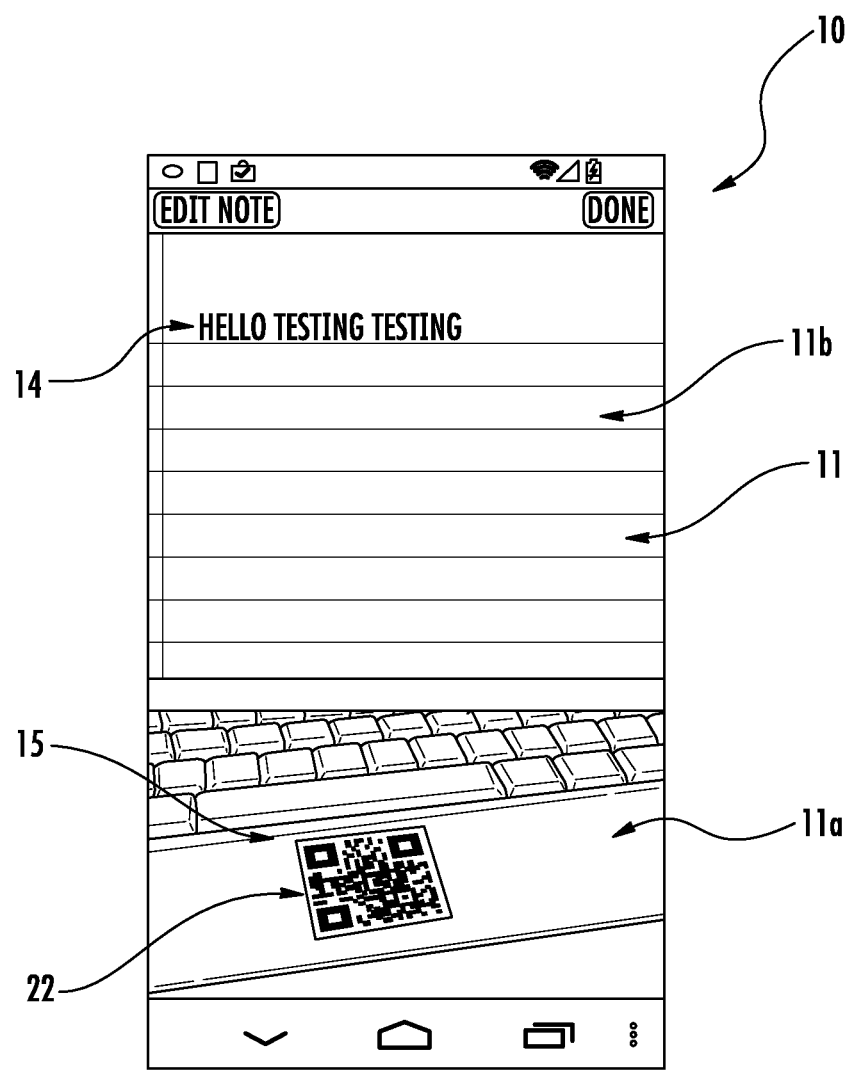
Figure 2C:
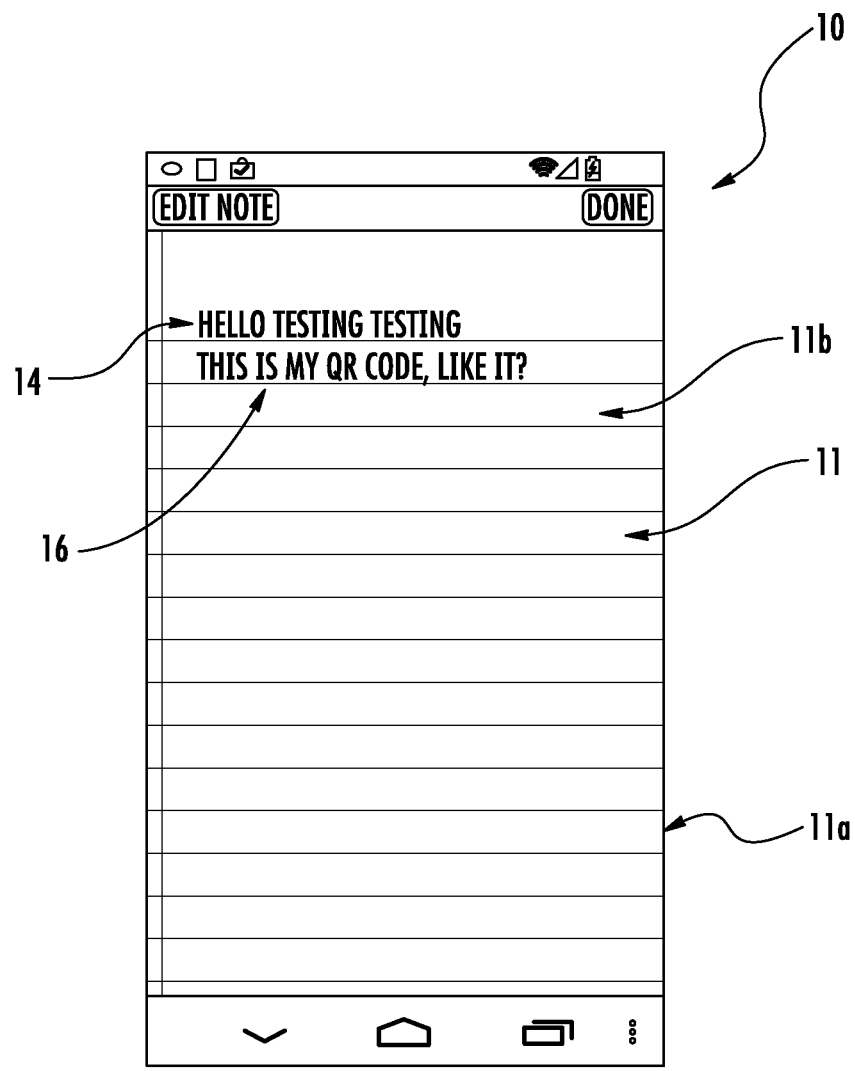

Referring to FIGS. 2a, 2b, and 2c, the smartphone (10) of FIG. 1 is further depicted with the barcode scanning application (19) in use.

In an exemplary embodiment, the smartphone (10) is illustrated with a visual display (11). The visual display has a first portion (11a) and a second portion (11b). The first portion (11a) is occupied by a custom software input panel (12). On the custom software input panel (12) is a barcode scanning key (13). The second portion (11b) of the visual display (11) is occupied by a running application (14), designated by the lined screen and the words "Hello testing testing".

When the barcode scanning key (13) is pressed by a user of the smartphone (10), the visual display (11) changes from that of FIG. 2a, to that of FIG. 2b. Referring now to FIG. 2b, a barcode viewfinder (15) has replaced the custom software input panel (12) of FIG. 2a on the first portion (11a) of the visual display (11). The barcode scanning application (19) of FIG. 1 is initialized with the press of the barcode scanning key (13) and subsequently scans and decodes the barcode (22) in the viewfinder (15).

Referring now to FIG. 2c, the keyboard wedge has taken the decoded barcode information and translated the information into keyboard strokes (16) which appear in the running application (14); the decoded barcode information translated into keyboard strokes (16) appears on the visual display (11) as the words "This is my QR Code, like it?". In FIGS. 2a, 2b, and 2c, the running application (14) has continuously been displayed on the second portion (11b) of the visual display (11) during the entire the barcode scanning operation.

In another exemplary embodiment, the custom software input panel (12) may be minimized when the barcode scanning key (13) is pressed. Alternatively, in another exemplary embodiment, the custom software input panel (12) may be closed when the barcode scanning key (13) is pressed.

In another exemplary embodiment, the custom software input panel (12) may be re-opened or re-displayed on the first portion (11a) of the visual display (11) after the barcode (22) is scanned.

The smartphone (10) may be provided with other features and capabilities not shown or described here. For example, in another exemplary embodiment, the smartphone (10) is provided with means for wireless communication. The scanned barcode image may be transmitted via the means for wireless communications to a remote location for decoding, and then the decoded information may be transmitted back to the smartphone (10) wherein the keyboard wedge (18) captures the decoded information, translates it into keyboard strokes (16), and causes it to be displayed in the running application (15).

Figure 3:
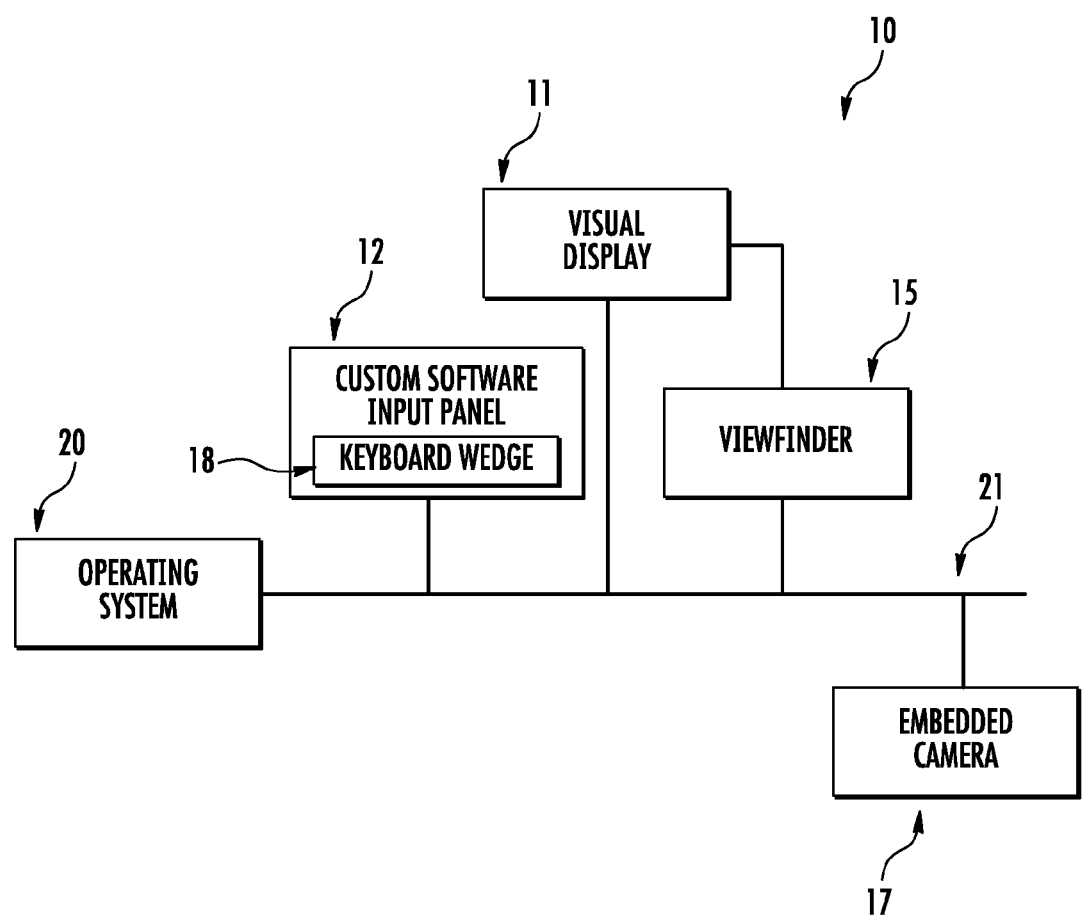
FIG. 3 schematically depicts a smartphone with components for another exemplary embodiment of the barcode scanning application of the invention.

Referring now to FIG. 3, in another exemplary embodiment, a smartphone (10) is provided with components similar to those in FIG. 1 described hereinbefore. However in the present embodiment, the keyboard wedge (18) is resident as an integral part of the custom software input panel (12). The keyboard wedge (18) controls the barcode scanning operation. The custom software input panel (12) and keyboard wedge (18) cooperate as shown in FIGS. 2a-2c to initiate and run a barcode scanning operation on the lower portion (11a) of the visual display (11) while continuously running and displaying another application on the upper portion (11b) of the visual display (11).

Figure 4:
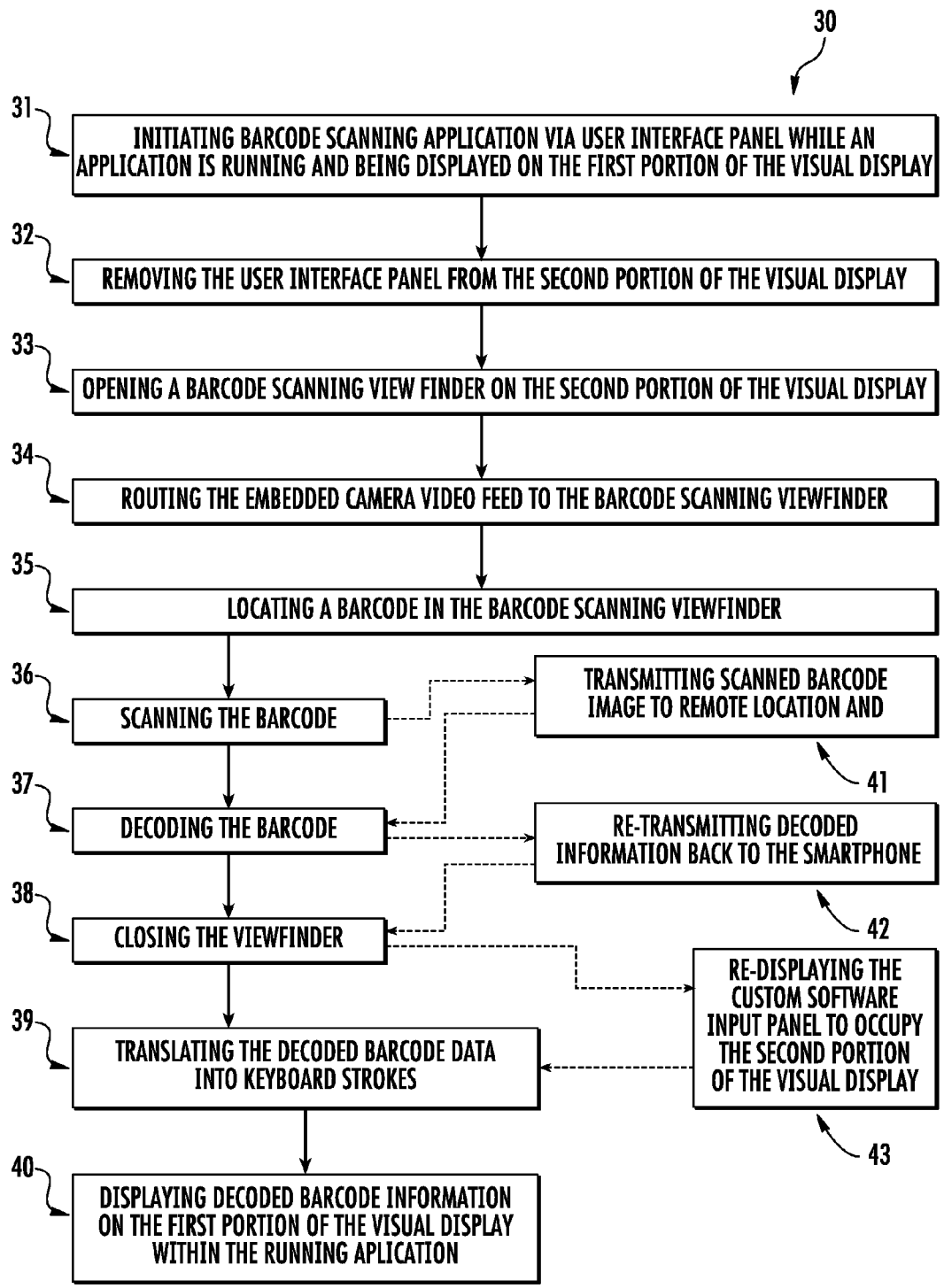
FIG. 4 schematically depicts the method of scanning a barcode with a smartphone of the present invention.

The present invention also embraces a method of scanning a barcode with a smartphone while continuously running and displaying another application on the smartphone. Referring to FIG. 4, in an exemplary embodiment, the method (30) of scanning a barcode with a smartphone while continuously running and displaying an application on the smartphone visual display is illustrated with a flowchart. Generally the smartphone of the method is the same as has been described hereinbefore in connection with FIG. 1 or FIG. 3 and as shown in operation in FIGS. 2a-2c.

In an exemplary embodiment, the method (30) is comprised of the steps of: (31) initiating barcode scanning via the user interface panel while an application is running and being displayed on the first portion of the smartphone visual display; (32) removing the user interface panel from the second portion of the smartphone visual display; (33) opening a barcode scanning viewfinder on the second portion of the smartphone visual display previously occupied by the user interface panel; (34) routing the embedded camera video feed to the barcode scanning viewfinder; (35) locating a barcode in the barcode scanning viewfinder; (36) scanning the barcode; (37) decoding the barcode; (38) closing the viewfinder; (39) translating the decoded barcode data into keyboard strokes; and (40) displaying decoded barcode information on the first portion of the smartphone visual display within the running application.

In another exemplary embodiment, the method (30) further comprises the optional step of (43) re-displaying the custom software input panel to occupy the second portion of the visual display after the viewfinder is closed in the (38) closing step.

In yet another exemplary embodiment, the (37) decoding step is accomplished at a remote location. Most if not all smartphones are equipped with wireless communication capabilities. The scanned barcode image can be transmitted to a remote location for decoding and then the information transmitted back to the smartphone for display. In this exemplary embodiment, the method (30) further comprises the steps of: (41) transmitting the scanned barcode image to a remote location after the (36) scanning step, and (42) retransmitting the decoded information back to the smartphone after the (37) decoding step.

In the exemplary embodiments of the method (30) described hereinbefore and depicted schematically in FIG. 3, an application continuously runs and is displayed on a portion of the visual display of the smartphone. A custom software input panel, which includes a barcode scanning key has been provided on the smartphone. This custom software input panel, when accessed, occupies only a portion of the visual display, such that the running application is still displayed. When the barcode key is pressed, the barcode scanning application is initialized. The custom software input panel on the visual display is removed, minimized or closed, and replaced with a barcode viewfinder, while the running application remains running and displayed on a portion of the visual display. The user locates and scans a barcode in the viewfinder. The barcode scanning application decodes the barcode. The keyboard wedge takes the decoded information, translates it into keyboard strokes, and displays it in the running application on the visual display.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;

U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;

U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);
U.S. Patent Application No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. Patent Application No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. Patent Application No. 29/459,620 for an Electronic Device Enclosure, filed Jul. 2, 2013 (London et al.);
U.S. Patent Application No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. Patent Application No. 29/459,785 for a Scanner and Charging Base, filed Jul. 3, 2013 (Fitch et al.);
U.S. Patent Application No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. Patent Application No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/150,393 for Indicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.); U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed 08-04-2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTON CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. Patent Application No. 29/486,759 for an Imaging Terminal, filed Apr. 2, 2014 (Oberpriller et al.);

U.S. Patent Application No. 29/492,903 for an INDICIA SCANNER, filed Jun. 4, 2014 (Zhou et al.); and U.S. Patent Application No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A barcode scanning application for a smartphone, the smart phone having an embedded camera, a visual display, and an operating system, the operating system communicatively coupling the embedded camera and the visual display; the barcode scanning application comprising:
   a custom software input panel, the custom software input panel being provided with a barcode scanning key; the custom software input panel occupying a first portion of the visual display;
   a keyboard wedge capable of translating barcode data into keyboard strokes;
   the barcode scanning application being communicatively coupled through the operating system to the embedded camera, the keyboard wedge and the custom software input panel; the barcode scanning application being configured to operate while a different application is running and being displayed continuously on a second portion of the visual display;
   the custom software input panel being configured to initiate the barcode scanning application when the barcode scanning key is touched;
   the barcode scanning application, once initialized, being configured to cause the custom software input panel to be removed from the first portion of the visual display and to open a barcode viewfinder on the portion of the visual display previously occupied by the custom software input panel;
   the barcode scanning application being configured to scan a barcode in the viewfinder, close the viewfinder, decode the scanned barcode, and send the barcode information to the keyboard wedge; and
   the keyboard wedge being configured to translate the decoded barcode information into keyboard strokes, and to send the keyboard strokes to be displayed within the different application running and displayed continuously on the second portion of the visual display.

2. The barcode scanning application of claim 1, wherein the keyboard wedge is a software program, the keyboard wedge being an integral part of the custom software input panel.

3. The barcode scanning application of claim 1, wherein the keyboard wedge is a hardware device incorporated into the smartphone.

4. The barcode scanning application of claim 1, wherein the barcode scanning application is further configured to re-display the custom software input panel after closing the viewfinder.

5. The barcode scanning application of claim 1, wherein the first portion of the visual display occupies less than 50% of the visual display.

6. The barcode scanning application of claim 1, wherein causing the custom software input panel to be removed from the first portion of the visual display is accomplished by minimizing the custom software input panel.

7. The barcode scanning application of claim 1, wherein causing the custom software input panel to be removed from the first portion of the visual display is accomplished by closing the custom software input panel.

8. A method of scanning a barcode with a smartphone while continuously running and displaying an application on a first portion of a smartphone visual display, the smartphone being provided with a user interface panel occupying a second portion of the smartphone visual display, the smartphone being provided with barcode scanning software, a viewfinder, and an embedded camera; the barcode scanning software, the viewfinder, the embedded camera, the user interface panel, and the visual display being communicatively coupled; the method comprising:
   i. Initiating barcode scanning via the user interface panel while an application is running and being displayed on the first portion of the smartphone visual display;
   ii. Removing the user interface panel from the second portion of the smartphone visual display;
   iii. Opening a barcode scanning viewfinder on the second portion of the smartphone visual display previously occupied by the user interface panel;
   iv. Routing the embedded camera video feed to the barcode scanning viewfinder;
   v. Locating a barcode in the barcode scanning viewfinder;
   vi. Scanning the barcode;
   vii. Decoding the barcode;
   viii. Closing the viewfinder;
   ix. Translating the decoded barcode data into keyboard strokes; and
   x. Displaying decoded barcode information on the first portion of the smartphone visual display within the running application.

9. The method of claim 8, wherein the user interface panel is a custom software input panel, the custom software input panel having a barcode scanning key; and the initiating step being accomplished by touching the barcode scanning key.

10. The method of claim 8, wherein the user interface panel is provided with voice command capability; and the initiating step is accomplished by a voice command.

11. The method of claim 8, further comprising re-displaying the custom software input panel to occupy the second portion of the smartphone visual display after the closing the viewfinder step.

12. The method of claim 8, wherein the decoding step is accomplished at a remote location, the remote location being wireless enabled and in communication with the smartphone; the method further comprising the steps of transmitting the scanned barcode image to a remote location before the decoding step; and transmitting decoded barcode information back to the smartphone after the decoding step.

13. The method of claim 8, wherein the smartphone is further provided with a keyboard wedge, the keyboard wedge being communicatively coupled to the barcode scanning software; and wherein the translating step is accomplished by the keyboard wedge.

14. The method of claim 8, wherein the removing step is accomplished by closing the user interface.

15. The method of claim 8, wherein the removing step is accomplished by minimizing the user interface.

16. A barcode scanning application for a smartphone, the smart phone having an embedded camera, a visual display, and an operating system, the operating system communicatively coupling the embedded camera and the visual display; the barcode scanning application comprising:

a custom software input panel, the custom software input panel being provided with a barcode scanning key; the custom software input panel occupying a first portion of the visual display, the custom input panel being communicatively coupled through the operating system to the embedded camera;

a keyboard wedge capable of translating barcode data into keyboard strokes, the keyboard wedge being an integral part of the custom software input panel, the keyboard wedge configured to control a barcode scanning operation;

the custom software input panel being configured to initiate the barcode scanning operation when the barcode scanning key is touched;

the keyboard wedge being configured to operate the barcode scanning operation while a different application is running and being displayed continuously on a second portion of the visual display;

the custom software input panel, upon initiating barcode scanning, being configured to minimize and to open a barcode viewfinder on the first portion of the visual display previously occupied by the custom software input panel;

the keyboard wedge being configured to scan a barcode in the barcode viewfinder, close the viewfinder, decode the scanned barcode, translate the decoded barcode information into keyboard strokes, and to send the keyboard strokes to be displayed within the different application running and displayed continuously on the second portion of the visual display.

17. The barcode scanning application of claim 16, wherein the keyboard wedge is further configured to re-display the custom software input panel after closing the viewfinder.

* * * * *